(12) United States Patent
Tsuchiya et al.

(10) Patent No.: US 12,164,389 B2
(45) Date of Patent: Dec. 10, 2024

(54) AUTOMATIC COPY CONFIGURATION

(71) Applicant: Hitachi, Ltd., Tokyo (JP)

(72) Inventors: Akiyoshi Tsuchiya, San Jose, CA (US); Tomohiro Kawaguchi, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 8 days.

(21) Appl. No.: 17/955,320

(22) Filed: Sep. 28, 2022

(65) Prior Publication Data

US 2024/0103981 A1   Mar. 28, 2024

(51) Int. Cl.
G06F 16/00   (2019.01)
G06F 9/445   (2018.01)
G06F 11/14   (2006.01)

(52) U.S. Cl.
CPC ...... *G06F 11/1464* (2013.01); *G06F 9/44505* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 8,250,031 B2 | 8/2012 | Kawaguchi | |
| 10,180,798 B2* | 1/2019 | Kono | G06F 3/0605 |
| 10,223,024 B2* | 3/2019 | Sharma | G06F 3/0604 |
| 10,581,675 B1* | 3/2020 | Iyer | G06N 20/00 |
| 10,592,268 B2 | 3/2020 | Nasu et al. | |
| 10,601,920 B2* | 3/2020 | Jain | H04L 41/0803 |
| 10,776,210 B2 | 9/2020 | Slater et al. | |
| 11,281,543 B2* | 3/2022 | Wilcock | G06F 11/1456 |
| 2010/0077162 A1* | 3/2010 | Kaneko | G06F 3/0653 711/E12.001 |
| 2010/0312540 A1* | 12/2010 | Jess | G06F 3/0683 703/21 |
| 2016/0219103 A1* | 7/2016 | Jain | H04L 67/10 |
| 2016/0219106 A1* | 7/2016 | Jain | H04L 67/1097 |
| 2016/0219107 A1* | 7/2016 | Jain | G06F 3/0619 |
| 2018/0109619 A1* | 4/2018 | Jain | H04L 41/0895 |
| 2018/0109620 A1* | 4/2018 | Jain | H04L 67/10 |
| 2019/0199798 A1* | 6/2019 | Jain | H04L 67/1097 |
| 2019/0297145 A1* | 9/2019 | Jain | H04L 67/10 |
| 2019/0342391 A1* | 11/2019 | Jain | G06F 3/0689 |
| 2021/0382727 A1* | 12/2021 | Vigil | G06F 9/5022 |

FOREIGN PATENT DOCUMENTS

| | | | | |
|---|---|---|---|---|
| CN | 107077492 B | * | 9/2020 | ......... G06F 16/2315 |
| JP | 2020008944 A | * | 1/2020 | |
| WO | WO-2016068830 A1 | * | 5/2016 | ........... G06F 3/0605 |
| WO | WO-2018038740 A1 | * | 3/2018 | |

* cited by examiner

*Primary Examiner* — Jean M Corrielus
(74) *Attorney, Agent, or Firm* — Procopio, Cory, Hargreaves & Savitch LLP

(57) ABSTRACT

Example implementations described herein involve systems and methods that can include, responsive to a request to deploy an application using a storage of a storage system, managing a storage configuration for the application; managing data information and storage configuration information associated with a copy relationship between data used by the application and the storage configuration for the storage system; extracting and evaluating possible configuration patterns from the data information and the storage configuration information; and providing ones of the possible configuration patterns that satisfy specified requirements for the application.

8 Claims, 19 Drawing Sheets

Deploy Application

| | | |
|---|---|---|
| Name | App1 | |
| App Image | https://repo/app1 | |
| Site | Site2 ▶ | |
| Volume Size* | 1024 | GB |
| Storage | Storage1 ▶ | |
| Cost less than | 150 | $/month |

◀ Application Continuity Requirements

| | | |
|---|---|---|
| Availability | 99.999 | % |
| RPO | 10 | Minutes ▶ |

Seconds
Minutes
Hours
Days
Weeks

* = Required ( Next )

FIG. 2

| Candidate | | | | |
|---|---|---|---|---|
| Configuration | Availability | RPO | Cost | |
| ● Highest availability<br>Storage 1 (Site 1) →Sync Replication→ Storage 2 (Site 2) →Async Replication→ Storage 3 (Site 3) | 99.9999 | 0 second | $ 200 / month | |
| ○ Storage 1 (Site 1) →Sync Replication→ Storage 2 (Site 2) →Backup (Hourly)→ Storage 3 (Site 3) | 99.999 | 10 second | $ 125 / month | |
| ○ Lowest cost<br>Storage 1 (Site 1) →Backup Hourly→ Backup Tgt (Site 2) | 99.99 | 1 hour | $ 25 / month | |

Cancel   Create

FIG. 3

```
kind: VolumeClaim
metadata:
      name: claim1
spec:
      storage: storage1
      resources:
              request:
                      size: 30Gi
                      costLessThan: $150 / month
                      protection:
                              availability: 99.999
                              rpo: 10min
                              selectionPolicy: lowestCost
```

FIG. 4

| ID | App | Storage | Size |
|---|---|---|---|
| Vol1 | App1 | Stg 1 | 1 TB |
| Vol2 | App2 | Stg 2 | 1 TB |
| Vol3 | App3 | Stg 1 | 10 TB |
| Vol4 | App3 | Stg 2 | 10 TB |
| Bk B | -- | Tgt 2 | 1 TB |
| Bk C | -- | Tgt 3 | 1 TB |

FIG. 5

| ID | Site | Type | Total Capacity | Used Capacity | Availability | Cost |
|---|---|---|---|---|---|---|
| Stg 1 | Site 1 | Block | 100 TB | 50 TB | 99.999% | $0.000/GB |
| Stg 2 | Site 2 | Block | 200 TB | 100 TB | 99.99% | $0.100/GB |
| Stg 3 | Site 3 | Block | 200 TB | 150 TB | 99.99% | $0.100/GB |
| Stg 4 | Site 1 | File | 200 TB | 50 TB | 99.999% | $0.000/GB |
| Tgt 2 | Site 2 | Object | 300 TB | 150 TB | 99.99% | $0.025/GB |
| Tgt 3 | Site 3 | Object (archive) | 300 TB | 200 TB | 99.99% | $0.005/GB |

FIG. 6

| From | | To | | Method | RPO | Performance | | Cost |
|---|---|---|---|---|---|---|---|---|
| Site | Storage | Site | Storage | | | Throughput | Wait Time | |
| Site 1 | Stg 1 | Site 2 | Stg 2 | Sync Replication | 0 sec | 1 Gbps | 0 | $0.02/GB |
| Site 2 | Stg 2 | Site 1 | Stg 1 | Sync Replication | 0 sec | 1 Gbps | 0 | $0.1/GB |
| Site 1 | Stg 1 | Site 3 | Stg 3 | Async Replication | 10 sec | 1 Gbps | 0 | $0.02/GB |
| Site 1 | Stg 1 | Site 3 | Stg 3 | Async Replication | 10 sec | 1 Gbps | 0 | $0.02/GB |
| Site 3 | Stg 3 | Site 1 | Stg 1 | Async Replication | 10 sec | 1 Gbps | 0 | $0.1/GB |
| Site 2 | Stg 2 | Site 3 | Stg 3 | Async Replication | 10 sec | 1 Gbps | 0 | $0.1/GB |
| Site 3 | Stg 3 | Site 2 | Stg 2 | Async Replication | 10 sec | 1 Gbps | 0 | $0.1/GB |
| Site 1 | Stg 1 | Site 2 | Ttg 2 | Backup | 1 hour | 1 Gbps | 0 | $0.02/GB |
| Site 1 | Stg 1 | Site 3 | Ttg 3 | Backup | 1 day | 1 Gbps | 0 | $0.02/GB |
| Site 2 | Stg 2 | Site 3 | Ttg 3 | Backup | 1 day | 1 Gbps | 0 | $0.1/GB |
| Site 3 | Stg 3 | Site 2 | Ttg 2 | Backup | 1 hour | 1 Gbps | 0 | $0.1/GB |
| Site 2 | Stg 2 | Site 2 | Stg 2 | Clone | -- | Zero copy | 0 | 0 |
| Site 2 | Tgt 2 | Site 1 | Stg 1 | Restore | -- | 1 Gbps | 0 | $0.1/GB |
| Site 2 | Tgt 2 | Site 1 | Stg 1 | Restore | -- | 1 Gbps | 0 | $0.1/GB |
| Site 2 | Tgt 2 | Site 2 | Stg 2 | Restore | -- | 10 Gbps | 0 | $0.0002/GB |
| Site 2 | Tgt 2 | Site 3 | Stg 3 | Restore | -- | 1 Gbps | 0 | $0.1/GB |
| Site 3 | Tgt 3 | Site 1 | Stg 1 | Restore | -- | 1 Gbps | 300 sec | $0.1/GB |
| Site 3 | Tgt 3 | Site 2 | Stg 2 | Restore | -- | 1 Gbps | 300 sec | $0.1/GB |
| Site 3 | Tgt 3 | Site 3 | Stg 3 | Restore | -- | 10 Gbps | 300 sec | $0.0003/GB |

FIG. 7

| From | To | Diff Size | Deleted flag |
|---|---|---|---|
| Vol 1 | Vol 2 | 60 GB | No |
| Vol 1 | Bk A | 100 GB | Yes |
| Vol 1 | Bk B | 50 GB | No |
| Bk A | Bk C | 10 GB | No |
| Vol 3 | Vol 4 | 0 GB | No |

FIG. 8

Migrate Application

Name: App1
Site: Site2
Storage: Storage2

Requirements
Cost: Less than $ 10
Time: Less than $ 10 Minutes

Next

FIG. 13

```
kind: VolumeClaim
metadata:
    name: claim1
spec:
    storage: storage2
    sourceData:
        appName:app1
        requirements:
            costLessThan: 10
            timeLessthan: 10
            selectionPolicy: lowestCost
```

FIG. 15

```
kind: Migration
metadata:
    name: MigratingApp1
spec:
    targetApp: App1
    destination:
        site: site2
        storage storage2:
    requiremnets:
            costLessThan: 10
            timeLessthan: 10
            selectionPolicy: lowestCost
```

FIG. 16

Patten 1

Patten 2

Patten 3

Patten 4

Patten 5

Patten 6

AUTOMATIC COPY CONFIGURATION

BACKGROUND

Field

The present disclosure is generally related to cloud systems, and more specifically, to automatic copy configurations for cloud systems.

Related Art

The cloud native approach has been spread to improve operational agility of applications. In the related art, the Information Technology (IT) infrastructure administrators who have expertise are had been in charge of IT infrastructure operations. However, with this operational model, a large communication overhead between application operators and IT infrastructure administrators impede operational agility. With cloud native operations, application operators provision IT infrastructure resources by themselves to eliminate the communication overhead. Therefore, IT infrastructure resources need to be able to be provisioned without expertise.

As a part of IT infrastructure resource provisioning, it can be important to configure the data copy in order to operate applications for some use cases. One of important use cases is for application continuity which requires high availability (HA) and disaster recovery (DR) in order to meet requirements. Some applications have a huge impact on society and business. To prevent outages of these kinds of applications, the applications and their data need to be redundant and recoverable in order to continue operations even if a problem occurs. The other use cases of data copy are migration of application and data reuse. It is necessary to copy application data to the migration destination or location to deploy application which reuse data of other application.

Therefore, IT infrastructure and data management software and services need to provide capabilities that enable application operators to configure a data copy that meets the requirements of availability and agility requirements without having IT infrastructure expertise.

SUMMARY

In the related art, it can be difficult for application operators to configure an optimal configuration for application requirements.

Related art implementations require a predefinition of a configuration which application operators can use. However, there are many patterns of application requirements. Therefore, it is difficult to configure an optimal configuration against many requirement patterns because it is not realistic to predefine an optimal configuration against each requirement.

In addition, to utilize related art implementations, application operators must know where the backup is located. However, the operators do not know the actual data placement and copy/backup configuration, and especially when the application is operated by other application operators. In addition, there could be innumerable replicas such as backups of the data. Therefore, it takes extraordinary effort to plan the most efficient copy configuration from the innumerable copy configuration patterns.

Example implementations described herein involve a configurable copy pattern based on the actual storage configuration, evaluate each pattern, and selects the one that meets the requirements specified by the user. Instead of automatic selection, the user can select the one configuration based on the evaluation results.

Aspects of the present disclosure can involve a method, which can include, responsive to a request to deploy an application using a storage of a storage system, create volumes for the application or modify a configuration of the application or volumes used by the application, managing a storage configuration for the application; managing data information and storage configuration information associated with a copy relationship between data used by the application and the storage configuration for the storage system; extracting and evaluating possible configuration patterns from the data information and the storage configuration information; and providing ones of the possible configuration patterns that satisfy specified requirements for the application.

Aspects of the present disclosure can involve a computer program, which can include instructions involving, responsive to a request to deploy an application using a storage of a storage system, create volumes for the application or modify a configuration of the application or volumes used by the application, managing a storage configuration for the application; managing data information and storage configuration information associated with a copy relationship between data used by the application and the storage configuration for the storage system; extracting and evaluating possible configuration patterns from the data information and the storage configuration information; and providing ones of the possible configuration patterns that satisfy specified requirements for the application. The computer program and instructions can be stored in a non-transitory computer readable medium and executed by one or more processors.

Aspects of the present disclosure can involve a system, which can include, responsive to a request to deploy an application using a storage of a storage system, create volumes for the application or modify a configuration of the application or volumes used by the application, means for managing a storage configuration for the application; means for managing data information and storage configuration information associated with a copy relationship between data used by the application and the storage configuration for the storage system; means for extracting and evaluating possible configuration patterns from the data information and the storage configuration information; and means for providing ones of the possible configuration patterns that satisfy specified requirements for the application.

Aspects of the present disclosure can involve an apparatus, which can include a processor, configured to, responsive to a request to deploy an application using a storage of a storage system, manage a storage configuration for the application; manage data information and storage configuration information associated with a copy relationship between data used by the application and the storage configuration for the storage system; extract and evaluate possible configuration patterns from the data information and the storage configuration information; and provide ones of the possible configuration patterns that satisfy specified requirements for the application.

BRIEF DESCRIPTION OF DRAWINGS

FIG. 2 illustrates an example of a graphical user interface (GUI) for application deployment that requires application continuity, in accordance with an example implementation.

FIG. 3 illustrates an example of graphical user interface to show the data copy plan, in accordance with an example implementation.

FIG. 4 illustrates an example of a manifest to provision a volume with the data copy for the application continuity, in accordance with an example implementation.

FIG. 5 illustrates a data management table, in accordance with an example implementation.

FIG. 6 illustrates a storage management table, in accordance with an example implementation.

FIG. 7 illustrates available copy method information, in accordance with an example implementation.

FIG. 8 illustrates a copy relation management table, in accordance with an example implementation.

FIG. 13 illustrates an example of a graphical user interface to migrate the application, in accordance with an example implementation.

FIG. 15 illustrates an example of a manifest to request a volume having another application's data with a declarative IaC, in accordance with an example implementation.

FIG. 16 illustrates an example of a manifest to request application migration with declarative IaC, in accordance with an example implementation.

DETAILED DESCRIPTION

Figure 1:
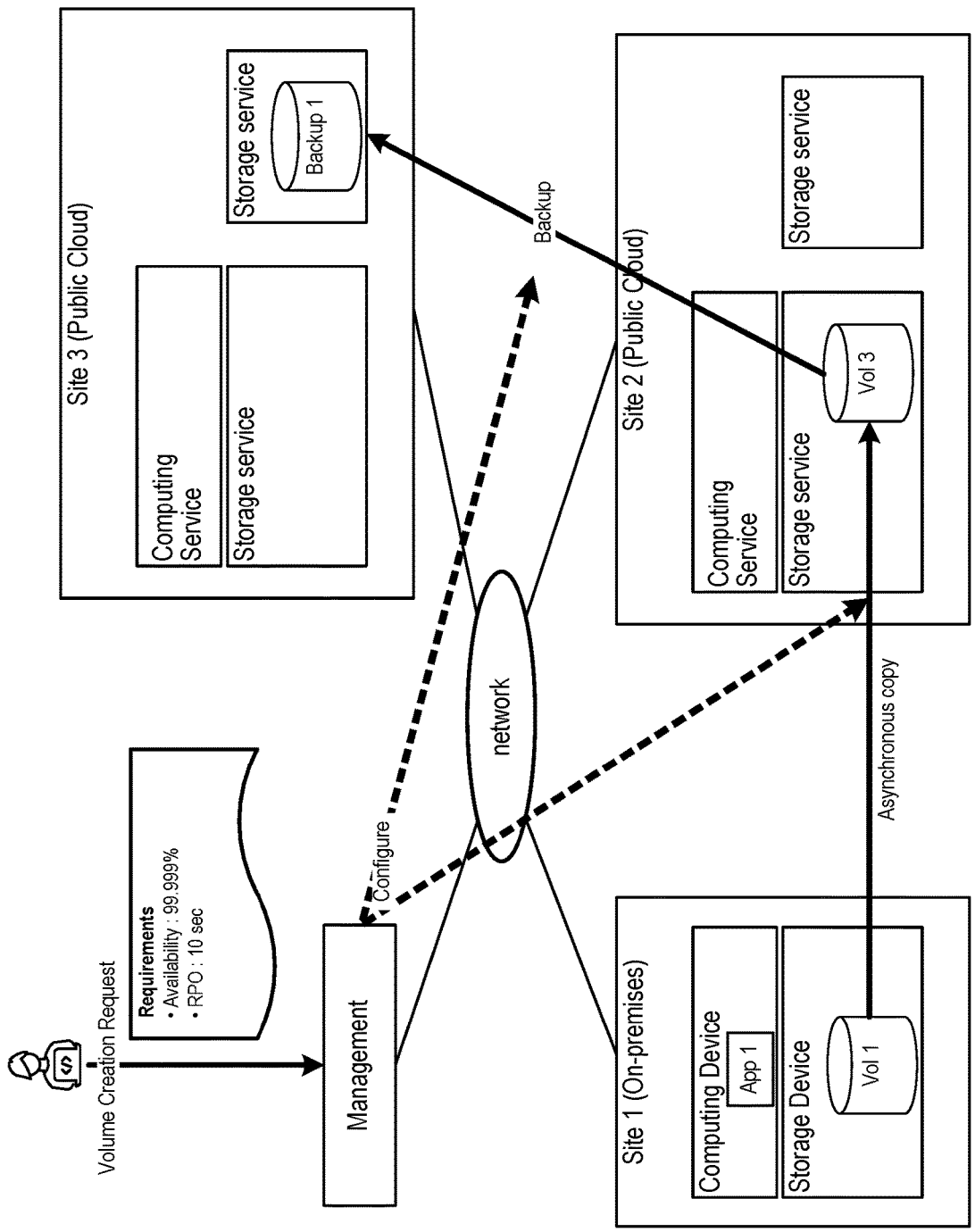
FIG. 1 illustrates an overview of an implementation example of data copy for application operation continuity, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

In a first example implementation, there is the configuration of the data copy for application operation continuity.

FIG. 1 illustrates overview of implementation example of data copy for application operation continuity, in accordance with an example implementation. Application operators request the management tool to create volumes while specifying application requirements. Typical examples of requirements are availability and recovery point objective (RPO). In the FIG. 1, the specified requirements are availability of 99.999% and RPO within ten seconds. According to the user request, management tool plan the optimal configuration.

The management tool can present multiple configuration patterns to the user and lets the user select the most suitable pattern among them. In another form, the management tool selects the most optimal pattern and automatically configures the data copy configuration. FIG. 1 illustrates the form in which the management tool is operated on a site independent of each site's system. A typical example is the form provided as Software as a Service (SaaS).

However, the present disclosure is not limited to the SaaS application, and the technology disclosed in the present disclosure can be applied in other forms. For example, the management tool can be operated in sites where the computing and storage platform exist or other sites. In addition, the example implementations disclosed in this present disclosure can be implemented as a function of a storage orchestration or driver as known in the art. In the present disclosure, the storage devices and storage services are collectively referred to as storage.

Each site can be an on-premises data center or a public cloud service. On-premise datacenters can involve at least storage devices and computing devices. These computing devices are managed by orchestration software as known in the art to control the execution of applications. A public cloud service can involve at least storage and compute services. The compute service is a service that executes VMs and containers as applications.

FIG. 2 illustrates an example of a graphical user interface (GUI) for application deployment that requires application continuity, in accordance with an example implementation. This User Interface (UI) is provided by the management tool. Using this UI, the user can deploy the application while creating the volume. The user can specify the application name, application image, site, volume size, storage, and application continuity requirements. Specifying volume requirements as part of the application deployment request is only one example and may take other forms. For example, volume requirements may be specified as part of a volume creation request. In this case, fields necessary for application launch, such as application image information, can be omitted.

The application name is the identifier of the application to be deployed. The application image is the image used to launch the application. Typical examples are container images and virtual machine (VM) images. The site is the location where the application is deployed and launched. In the case of an on-premises implementation, any identifier set by the user can be used. In the case of cloud services, a combination of service provider, region, and availability zone can be used as site information.

The volume size is the size of the volume required by the application. The storage is a field that specifies the storage device or service where the volume will be created. Cost is a field that specifies the upper cost limit of the configuration that users want to establish with this request.

Application continuity requirements is a set of fields to specify application operational continuity requirements. Availability and RPO can be specified as these requirements. Availability is a requirement that indicates the degree to which an application is continuously available. It can be specified as a number between 0% and 100%.

RPO is the specified goal regarding what point in time data should be recovered when recovering from a problem. It can be specified as a length of time. FIG. 2 shows a form of specification using a combination of numbers and units. It is common to set these kinds of requirements and objectives as indicators of service level objectives or requirements for applications. Therefore, application operators can specify these values in accordance with any desired implementation as known in the art. The example implementations of the present disclosure automatically designs and configures data copy configurations that meet the requirements specified here.

FIG. 2 illustrates a UI for a form in which the creation of a volume to be used by an application and the deployment of the application are performed at once. However, the application of this technology is not limited to this. Other forms may be used in which the creation of the volume to be used by the application and the deployment of the application are executed separately. In this case, two forms of implementation can be applicable.

The first is a form in which the application continuity requirements are specified at the time of volume. In this form, the technology disclosed in the present disclosure is applied during volume creation process to plan and evaluate the data copy configuration. After the creation of the volume and establishment of the data copy, the users request application deployment and specify that the application use the created volume.

The second form is a form in which a volume is created without a data copy, and then an application is deployed after specifying that the volume will be used. In this case, the application continuity requirements are specified when the application is deployed. Based on the specified requirements, a data copy configuration that satisfies the requirements is planned for the previously created volume.

In addition, it is not limited to when a new application is deployed or a new volume is created, but may also be performed when a requirement setting change is triggered for an existing application or existing volume.

FIG. 3 illustrates an example of graphical user interface to show the data copy plan, in accordance with an example implementation. This example UI shows multiple plans. Each entry has a configuration overview and its corresponding availability, RPO and cost. Users can instruct the management tool to build a copy configuration by selecting one of the configuration suggestions displayed. At this time, the user can sort the configuration plans by availability, RPO, and cost to find a more desirable configuration plan.

The form shown in FIG. 3 is an example of a UI for a user to interactively operate the system. In recent years, the use of Infrastructure as Code (IaC) which provisioning of IT infrastructure resource is done with code, has become widespread. In particular, declarative IaC which defines IT infrastructure configuration declaratively, is widely used. An example of users' request in such a declarative IaC is shown in FIG. 4.

FIG. 4 illustrates an example of manifest to request volume with declarative IaC, in accordance with an example implementation. Kind field indicates the type of the manifest. The example in FIG. 4 shows that it is a manifest that requires a volume. The metadata field indicates the metadata of this request. In this example, the request's name is claim1. The resources field defines the detail of the requested volume. The requests field defines the content of the request. Size is a field that specifies the volume size. The costLessThan fields that specifies the upper limit cost of the configuration users want to establish with this request.

Protection is a field that defines the request for data protection for application continuity. In the example in FIG. 4, 99.999% or higher as availability and 10 minutes or less as RPO are requested. By defining such a manifest, the content entered in the GUI in shown in FIG. 3 can be defined. The user requests a management tool to create a volume with this manifest. In this case, if there are multiple configurations that satisfy the requests defined in the protection field, the management tool can automatically select one of them and establish a copy. In this case, a field for specifying the selection policy can be provided to automatically establish the most suitable configuration among multiple configurations that satisfy the requirements. In FIG. 4, the field "selectionPolicy" corresponds to this. FIG. 4 shows the example to indicate to establish the configuration with the lowest cost. Other examples of the selection policies are "highest availability", "shortest RPO" and "lowest number of copies".

FIG. 4 illustrates the form of a manifest that instructs only volume creation. As shown in FIG. 2, even in a form that instruct application deployment and volume creation at once, the technology disclosed by present disclosure can be applicable.

FIG. 5 is an example of data management table, in accordance with an example implementation. This table is managed by management tool. This table manages the information of data created based on the user's requests exemplified in FIG. 2 and FIG. 3. Information managed by this table is also maintained by the storage devices and services. Therefore, the management tool does not retain this information, but can retrieve it from the storage devices whenever it is needed. In addition, to reduce the retrieval overhead, the information can be cached instead of retrieved each time.

Each entry of the volume management table can include an identifier (ID), application, storage, and size information. ID is an identifier of the volume. Application (App) is an identifier of the application which uses this volume. This information is specified by users when users deploy the application.

Storage is the identifier of the storage device or storage service that maintains the volume. Storage is either specified by the user as illustrated in FIG. 2 and FIG. 3, or determined by the management tool when the management tool plans and establishes the data copy. Size is the size of the volume.

FIG. 6 is an example of storage management table. This table is managed by the management tool. This information is provided by the storage administrators when the storage devices and services are installed. The information managed by this table is also maintained by the storage devices or services. Therefore, the management tool does not retain this information, but can retrieve it from the storage devices and services whenever it is needed. In addition, to reduce the retrieval overhead, the information can be cached instead of retrieved each time.

Each entry of the storage management table has ID, Site, Type, Total capacity, Used capacity, as well as Availability and Cost information. The ID is identifier of the storage device or service. The site is a location identifier indicating where the storage device or service is operated. In the case of on-premises, any identifier set by the user can be used. In the case of cloud services, a combination of service provider, region, and availability zone can be used as site information.

The type is a type of storage. Example of types can include block, file, object and object for archive. Block storages offer storage, which is accessible with block protocol such as Small computer system interface (SCSI) and Internet SCSI (iSCSI). File storages offers storage, which is accessible with a file protocol such as Network File System (NFS), Common Internet File System (CIFS), and Service Message Block (SMB). Object storages offer storage, which is accessible with object protocol such as S3. Object storages for archive offers storage offer storage, which is accessible with object protocol such as S3 with lower cost. These are examples and may be other types of storage depending on the desired implementation.

Total capacity is the total storage capacity of the storage. Used capacity is the used capacity out of the total storage capacity of the concerned storage.

The availability is the availability information of the storage device or storage service. In the case of on-premises, the storage operational requirements and goals set by the storage administrator can be used as this information. In the case of cloud services, the service level agreement (SLA) with the service provider can be used as this information.

The cost is storage cost information. In the case of on-premise services, the price is set by the storage administrator and should be a number greater than or equal to zero. For cloud services, it is the price set by the service provider.

FIG. 7 is an example of available copy method information, in accordance with an example implementation. This is information that indicates from which storage to which storage and in what way the data can be copied. This information is provided by the storage administrators when the storage devices and services are installed. The information managed by this table is also maintained by the storage devices or services as available functionality information. Therefore, the management tool does not retain this information, but can retrieve it from the storage devices and services whenever it is needed. In addition, to reduce the retrieval overhead, the information can be cached instead of retrieved each time.

Each entry has From, To, Method, RPO, Performance and Cost information.

"From" is a copy source storage device or service. This information has identifiers of site and storage. "To" is a copy destination storage device or service. This information has identifiers of site and storage.

"Method" is a copy method. Typical copy method is synchronous (sync) copy, asynchronous (async) copy, clone, backup, and restore. The sync replication synchronously replicates volume data between storages. The async replication asynchronously replicates volume data between storages. The clone replicates volume within a storage.

The backup copies volume data to backup target. The typical backup target is object storage and object storage for archive. Restore is restoration from backup.

"RPO" is the specification of RPO which this copy can provide.

"Performance" is the specification of copy performance which this copy can provide. It has information about throughput and wait time. Throughput indicates the amount of data that can be accessed per unit of time. Wait time is the time it takes from requesting data access to actually being able to access it. For some archival storage, it can take a long time.

"Cost" is the communication cost for each copy performed.

FIG. 8 shows an example of copy relation management table, in accordance with an example implementation. This table is managed by management tool. This table manages the data copy information established by the management tool in response to user requests. Information managed by this table is also maintained by the storage devices and services. Therefore, the management tool does not retain this information, but can retrieve it from the storage devices whenever it is needed. In addition, to reduce the retrieval overhead, the information can be cached instead of retrieved each time.

Each field has "From", "To", "Diff size" and "Deleted frag".

"From" is an identifier of the data which is data copy source.

"To" is an identifier of the data which is data copy destination.

"From" and "To" can be a combination of identifiers of site, storage and data.

"Diff size" is amount of differential data between copy source data and copy destination data. This information can be obtained by tracking the amount of difference by monitoring data updates of the source and destination data. Instead of always tracking it, the amount of difference can also be measured by comparing source and destination data. At this time, the amount of communication for comparison can be reduced by using existing technology such as the use of hashing.

"Deleted flag" is a flag indicating whether or not the copy destination has already been deleted. After copying the data, the original data may be deleted. For example, after copying the backup data to the archive storage, the backup is deleted. In such a case, the copy relationship of the deleted copy should also be recorded so that a copy configuration using the archived data can be planned.

Figure 9:
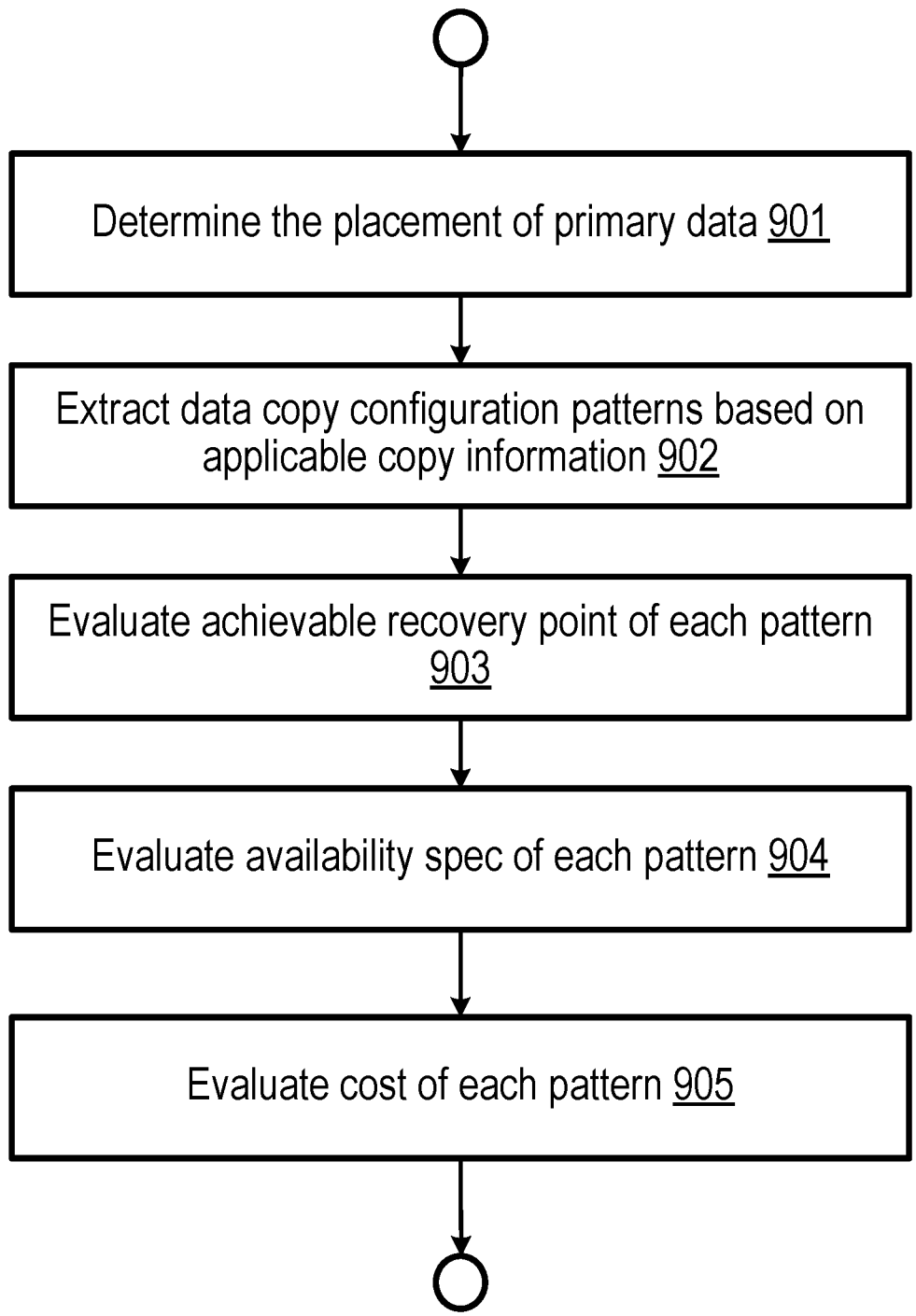
FIG. 9 illustrates a processing flow of planning data copy for application continuity, in accordance with an example implementation.

FIG. 9 is an example of processing flow to plan data copy configuration for application continuity, in accordance with an example implementation. This processing is performed by the management tool when users request to deploy an application, create a volume, or modify a setting of an application and volume with a specified requirement of application continuity.

Firstly, the management tool determines the placement of primary data at 901. Primary data is the volume that is normally used by the application. If users specify the placement when they make a request, then the management tool determines that as the primary data place the specified storage. If users do not specify, then the management tool automatically determines the placement. One example of the way to determine the placement is to select the storage with the highest availability.

At this step, the management tool does not select storages for which the available storage capacity is less than the volume size to be created. The available storage capacity can be calculated as a difference between the total capacity and the used capacity which can be retrieved from the storage management table. If the storage specified by the user does not have enough available capacity, then the management tool present an error and terminate the process.

Such an example implementation can minimize the probability that the primary data will become unavailable and that the application need to be recovered with the copied data.

Next, the management tools extract data copy configuration patterns according to available copy method information shown in FIG. 7 at 902. This step is implemented as a process to extract data copy configuration patterns as a set of subgraphs of a graph, where storage is a vertex, copies are directed edges, and all copy in available copy method information is drawn. FIG. 9 illustrate an example of this extraction processing.

Figure 10A:
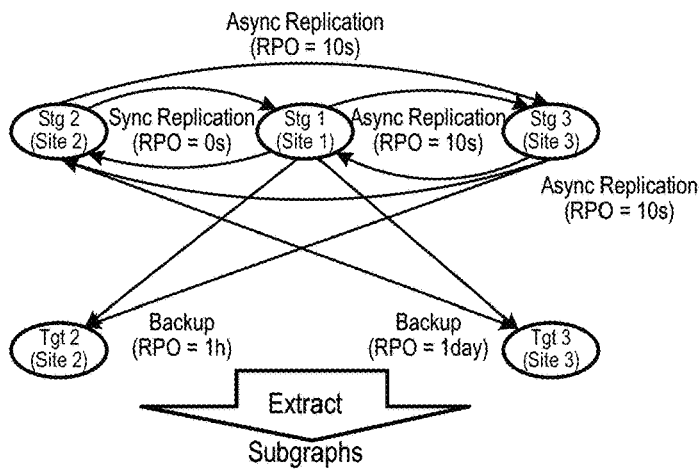
FIG. 10A-FIG. 10F illustrate an example of extracting data copy configuration patterns as subgraphs, in accordance with an example implementation.
Figure 10B:
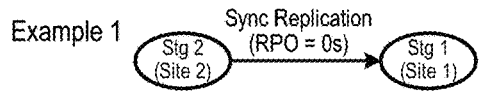
Figure 10C:
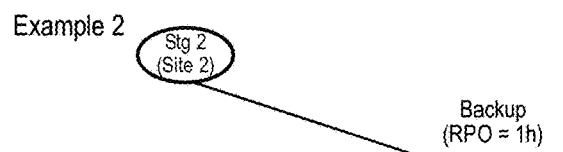
Figure 10D:
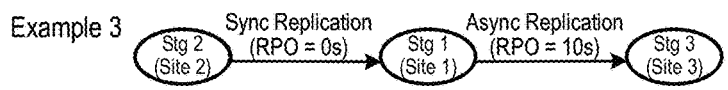

The graph shown in FIG. 10A is the overall graph which can be created based on available copy method information shown in FIG. 7. A graph involving a subset of the set of vertices and directed edges of this graph is a constructible composition pattern. Examples 1-5 in FIG. 10B-10F are the subgraph examples which can be extracted from the graph shown at the top. In this case, the copy used to recover the data in case of a problem shall not be included in the graph. In addition, copy methods which do not copy data among storages are also excluded because they do not contribute to improved availability. For example, restore and clone are excluded in the case of the copy methods illustrated in FIG. 7. In addition, the management tool can exclude storages which the available storage capacity is less than the volume size to be created. This allows for the creation of data copy configuration patterns which use only storage with sufficient capacity to copy data. The available storage capacity can be calculated as difference between the total capacity and the used capacity which can be retrieved from the storage management table shown in FIG. 6. The result of this calculation may be retained in the storage management table in advance.

For subgraph extraction, existing techniques that are provided as libraries in many programming languages can be applied. Other implementations can involve referring to the available copy method information and searching for available copies for the primary data placement as a starting point. In this case, further available copies at the copy destination are recursively searched, and each pattern found during the search is added to the subgraph set.

The above search may be terminated or excluded from subgraph set in order to exclude copies that are not effective in reducing computational cost, avoiding infinite loops, or improving continuity. The conditions for this are as follows.

The graphs which have a cycle: One way to implement the exclusion is to exclude subgraph for which the topological sorting fails.

The number of edges exceeds the threshold: Many edges in a subgraph means that the copy configuration pattern has many copies. Too many copies can make the configuration too complicated.

Figure 10E:
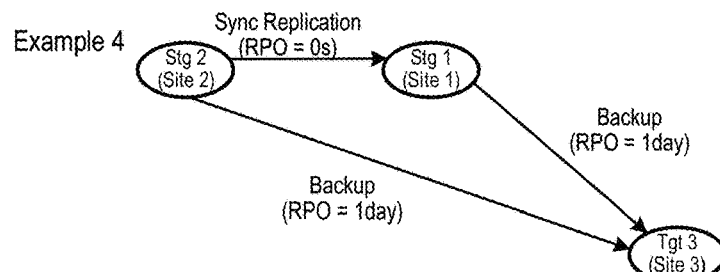
Figure 10F:
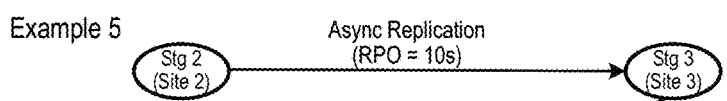

Copying to the same site or the same storage more than twice: Copying data to the same location is not effective in improving continuity, as both will be unavailable at the same time if there is a problem with the site or storage. Example 4 and 5 in FIG. 10E and FIG. 10F are examples which are excluded from the subgraph set because of this condition.

Next, the management tool evaluates if the achievable recovery point of each configuration pattern meets RPO requirements at 903. The directed edges in the subgraph are weighted by the RPO, and the achievable recovery point of each vertex (storage) is calculated as the sum of the weights of the edges from the starting point to the vertex. For example, the achievable recovery point of data copied to tgt2 in example 5 of FIG. 10F is 1 hour and 10 seconds. If the pattern has at least one vertex which the achievable recovery point is equal to or smaller than the RPO requirement, the management tool determines the pattern can meet the RPO requirements.

Other implementation examples for the evaluation for RPO are conducted by calculating of achievable recovery point of copy configuration pattern from the availability and the achievable recovery point of each vertex (storage). If the achievable recovery point of the copy configuration pattern is equal to or small than the RPO requirement, the management tool can determine that the pattern can meet the RPO requirements. The achievable recovery point of the copy configuration pattern can be estimated with following formula.

$$\text{achievable recovery point of copy configuration pattern} = \sum_{i=1}^{N} RP_i \left( \prod_{j=1}^{i-1} (1 - P_j) \right)$$

Since the subgraph is a directed acyclic graph, topological sorting can be performed against each subgraph. The management tool performs topological sorting and numbering the vertex from the top. In the formula, $P_i$ is the availability of the i-th vertex (storage) and $RP_i$ is the achievable recovery point of i-th vertex (storage). The management tool can get availability information by referring to the corresponding entry for each storage of the storage management table. In addition, $RP_1$ is zero because the data on $1^{st}$ vertex (storage) is the newest data. If there are multiple topological sorting results, the same calculation is performed for each result, and the one with the smallest numerical value is used as the achievable recovery point of the copy configuration pattern for the subgraph. Alternatively, by weighting each directed edge in each subgraph by the RPO, topological sorting that preferentially searches for directed edges with a small RPO can be performed, and the topological sorting results to be evaluated can be narrowed down to one. If the achievable recovery point of the pattern is equal to or smaller than the RPO requirement, the management tool determine the pattern can meet the RPO requirements.

Next, the management tool evaluates availability of each configuration pattern at 904. Based on the storage management table and available copy information, the availability for each configuration pattern is calculated based on the storage availability and data recovery time. The availability can be estimated with following formula.

Availability=1−(probability that all sites are down)−
(probability of unavailability for data recovery)

To calculate this, one example of estimation formula is below $$\text{Availability} = 1 - \left\{ \prod_{i=1}^{N} (1 - P_i) \right\} - \frac{\sum_{i=2}^{N} \left\{ RT_i \left( \prod_{j=1}^{i-1} (1 - P_j) \right) \right\}}{\text{Time}}$$

Since the subgraph is a directed acyclic graph, topological sorting can be performed against each subgraph. The management tool performs topological sorting and numbering the vertex from the top. In the formula, $P_i$ is the availability of the i-th vertex (storage) and $RT_i$ is the data recovery time from the i-th vertex (storage). If the copy method is synchronous or asynchronous replication, the recovery time is zero because the application can use the copied data immediately. If the copy method is a backup or an archive, the recovery time is not zero and can be calculated from the available copy information and volume size. The recovery time can be estimated as the quotient of the data size divided by the throughput. Time in this formula is the length of a certain period of time that availability is monitored. Specifically, one week, one month, one year, and so on, can be used. If there are multiple topological sorting results, the same calculation is performed for each result, and the one with the highest numerical value is used as the availability evaluation result for the subgraph. Alternatively, by weighting each directed edge in each subgraph by the RPO, topological sorting that preferentially searches for directed edges with a small RPO can be performed, and the topological sorting results to be evaluated can be narrowed down to one. If the estimated availability of the pattern is equal to or higher than the availability requirement, the management tool determine the pattern can meet the availability requirements.

Finally, the cost of each configuration pattern is evaluated at 905. This can be calculated as the sum of the storage costs in each configuration pattern. The storage cost can be calculated as the product of the unit price of each storage and the volume size. The storage management table contains the unit price information for storage costs. For the calculation of the cost, the communication cost for data copying may be added. One example of calculating the communication cost is as the sum of the product of the communication cost of the copy method included in each copy pattern and the data volume. The communication cost of each copy method is obtained from the cost field of the available copy method information shown in FIG. 7. If the estimated cost of the pattern is equal to or smaller than the cost requirement, the management tool determine the pattern can meet the cost requirements.

The results of this processing are presented to users in the UI illustrated in FIG. 3. In this case, configuration patterns which do not meet the availability, RPO or cost requirements specified by the users can be excluded from the presentation. The one selected by the user in this UI is established by the management tool. In the case of use through the declarative IaC instead of interactive UI, the configuration pattern that satisfies the requirements specified by the user is automatically selected and established. If there are multiple configuration patterns that satisfy the requirements, the management tool selects one according to the selection policy specified by the user and establishes the selected configuration pattern.

When the selected copy configuration is established, the copy configuration is recorded in the copy relation management table. If the configuration has multiple copies, each copy shall be added as one entry.

In a second example implementation, the data copy is configured for application migration and for deployment of an application which reuses the data of another application. In the description of the second example implementation as follows, the parts in common with the first example implementation are omitted.

When migrating an application or deploying an application that is reusing data from another application, it is necessary to copy the data used by the application. In this case, by using known related art techniques, it may be more efficient to copy most of the data from other replicas such as backups of the copy source data, and copy only the differential parts from the copy source data, rather than directly copying all of the data from the copy source data. In such a case, if there are many replicas, there are many possible patterns that can be constructed. In addition, which configuration is most suitable depends on the difference amount between the source data and its replicas, the communication cost, and the access performance of the destination of the replicas. Because of these reasons, it is difficult for the application operator to establish the optimal copy configuration.

Therefore, the management tool in the second example implementation extracts and evaluates the possible copy configurations based on the location information of the replicas and the available copy method information. Such implementations facilitate the construction of the optimal copy configuration.

Figure 11:
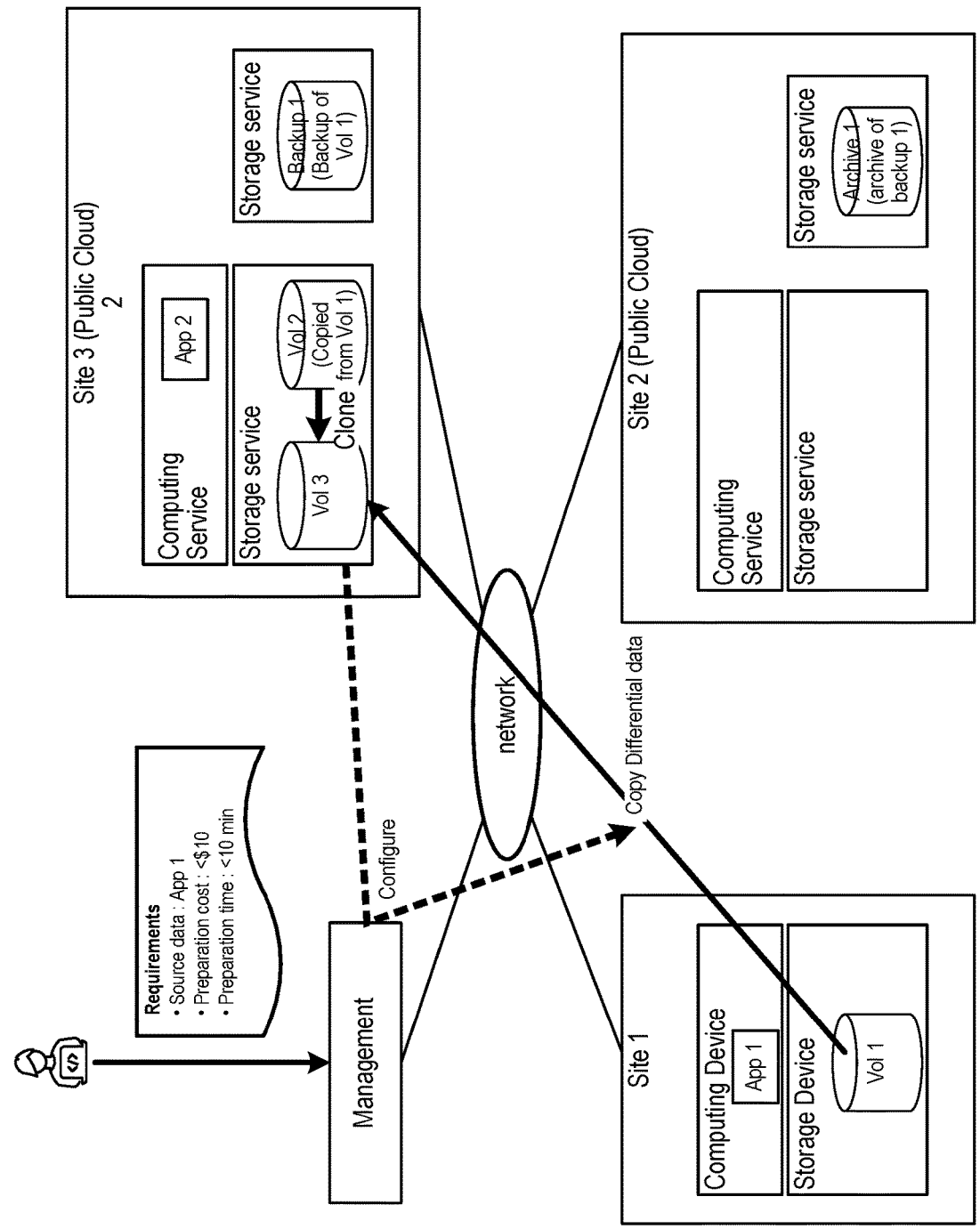
FIG. 11 illustrates an example of an overall system to configure a data copy for migrating an application or reusing data, in accordance with an example implementation.

FIG. 11 illustrates an overview of implementation example of data copy for a migrating application or for deploying an application which reuses another application's data, in accordance with an example implementation. In the FIG. 11, the users request the management tool to prepare a volume having App 1's data within $10 and 10 minutes. Based on the request, the management tool plans the data copy and establish the copy.

Figure 12:
FIG. 12 illustrates an example of a graphical user interface to deploy an application that reuses another application's data, in accordance with an example implementation.

FIG. 12 illustrates an example of a graphical user interface to deploy an application that reuses another application's data, in accordance with an example implementation. This UI is provided by the management tool. Using this UI, the user can deploy the application while creating the volume having another application's data. The user can specify the application name, application image, site, volume size, storage, and whether the volume should have data from another application or not. The application name is the identifier of the application to be deployed. The application image is the image used to launch the application. Typical examples are container images and virtual machine (VM) images. The site is the location where application is deployed and launched. The storage is a field that specifies the storage device or service where the volume will be created.

If volume for the application should be empty (empty means that the volume should not have another application's data), users select "Empty volume" and specify the size of volume.

If volume for the application should have another application's data, users select "Source data". In addition, users specify the application name of application which have source data and copy requirements. Copy requirements typically include cost and copy time.

FIG. 12 illustrates a UI for a form in which the creation of a volume to be used by an application and the deployment of the application are performed at once. However, the application of this technology is not limited to this example. Other forms may be used in which the creation of the volume to be used by the application and the deployment of the application are executed separately. In this case, two forms of implementation can be applicable as described below.

The first form is a form in which the source data is specified at the time of volume creation. In this form, the technology disclosed in the present disclosure is applied at the volume creation process to plan and evaluate the data copy configuration. After creating the volume and establishing the data copy, users request application deployment with specifying that the application use the created volume.

The second form is a form in which a volume is created without a data copy, and then an application is deployed after specifying that the volume will be used. In this form, the source data is specified when the application is deployed.

Based on the specified source data, a data copy configuration is planned for the previously created volume.

In addition, it is not limited to when a new application is deployed or a new volume is created, but may also be performed when a setting change is triggered for an existing application or existing volume.

FIG. 13 illustrates an example of a graphical user interface to migrate the application, in accordance with an example implementation. This UI is provided by the management tool. Using this UI, the user can migrate the application. The user can specify the application name, site, storage and requirements. The application name is the identifier of the application to be deployed. The site is the destination location where the application is migrated. The storage is a field that specifies the storage device or service where the volume is migrated. The requirements field is a field that specifies the data copy requirements for application migration. The same information as the copy requirements shown in FIG. 12 can be specified in this field.

Figure 14:
FIG. 14 illustrates an example of graphical user interface to show the data copy plan for the second example implementation.

FIG. 14 illustrates an example of graphical user interface to show the data copy plan for the second example implementation. This UI shows multiple plans. Each entry has configuration overview and its cost and time to copy. Users can instruct the management tool to establish a copy configuration by selecting one of the configuration suggestions displayed. At this time, the user can sort the configuration plans by cost and time to find a more desirable configuration plan. The forms shown in FIG. 12 and FIG. 13 are examples of a UI for a user to interactively operate the system. As with the first example implementation, UI with IaC can be applicable.

FIG. 15 illustrates an example of a manifest to request a volume having another application's data with a declarative IaC, in accordance with an example implementation. The kind field indicates the type of the manifest. The example in FIG. 15 shows that it is a manifest that requests a volume. The metadata field indicates the metadata of this request. In this example, the request's name is claim1. The sourceData field specifies which application's data should be sourced, and the requirements for copying that data to the created volume. The appName is an identifier of the application which has data to be reused. The requirements field indicates the copy requirements. The costLessThan field specifies the upper limit requirement for the copy cost. timeLessThan is a field that specifies the upper limit requirement for the time required for copying. The selectionPolicy is a selection policy when there are multiple copy configurations that satisfy these requirements.

FIG. 15 illustrates the form of a manifest that instructs only volume creation. As shown in FIG. 12, the example implementations described herein can be applicable even in a form that instructs application deployment and volume creation at once.

FIG. 16 illustrates an example of a manifest to request application migration with declarative IaC, in accordance with an example implementation. The kind field indicates the type of the manifest. The example in FIG. 15 shows that it is a manifest that requests application migration. The metadata field indicates the metadata of this request. In this example, the request's name is MigrationApp1. The TargetApp field indicate an identifier of target application to be migrated. The destination field indicates a migration destination. This field has site and storage. The site is an identifier of the site to where the application is migrated. Storage is an identifier of the storage to which data of application is migrated. The requirements field is the same as in FIG. 15.

Figure 17:
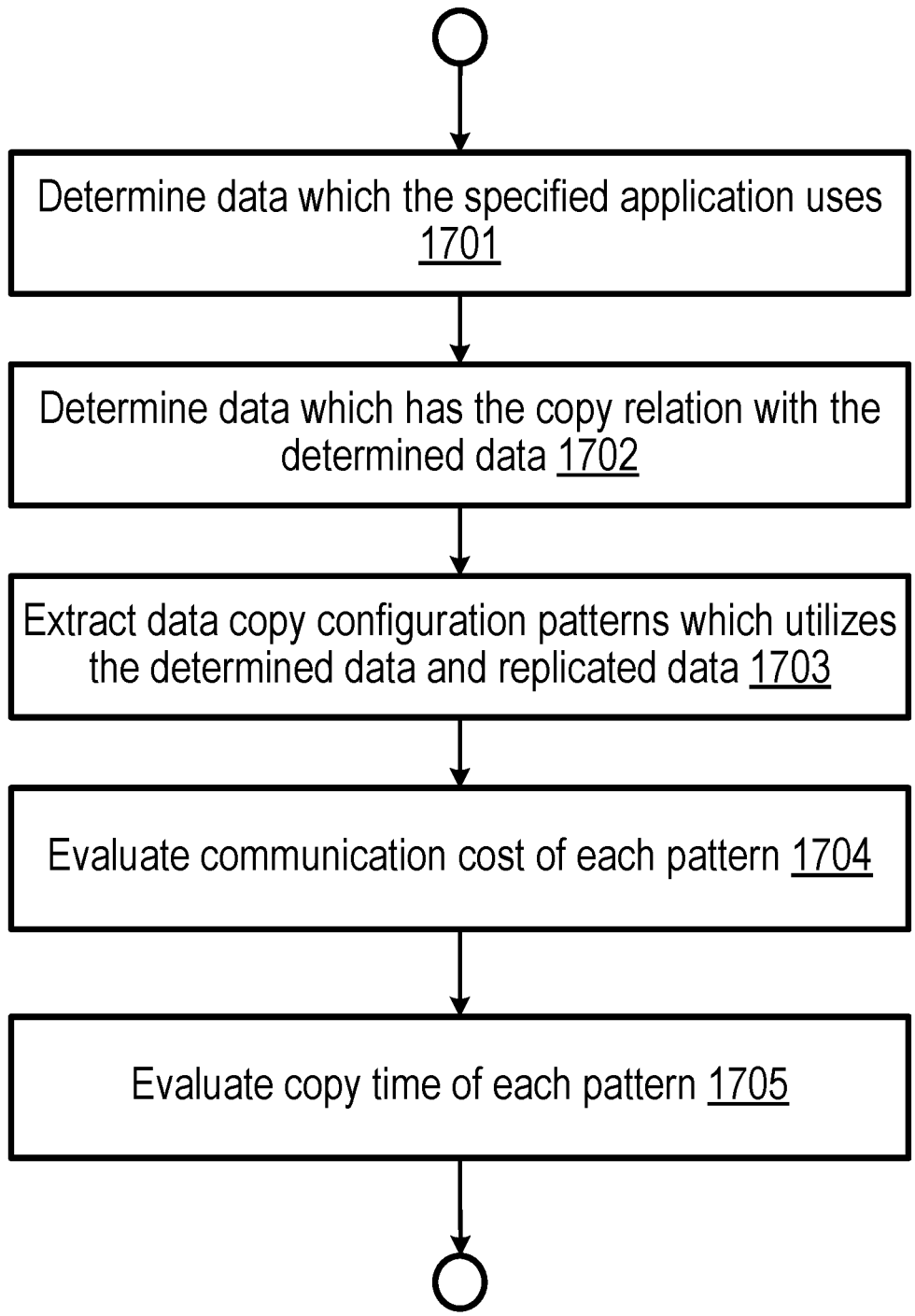
FIG. 17 is an example of processing flow to plan data copy configuration for application migration and reusing another application's data, in accordance with an example implementation.
Figure 18A:
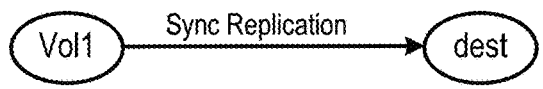
FIG. 18A-FIG. 18F illustrate copy configuration patterns for migrating application or reusing another application's data, in accordance with an example implementation.
Figure 18B:
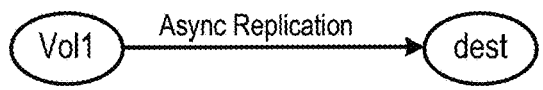
Figure 18C:
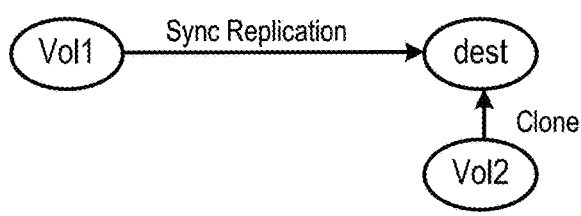
Figure 18D:
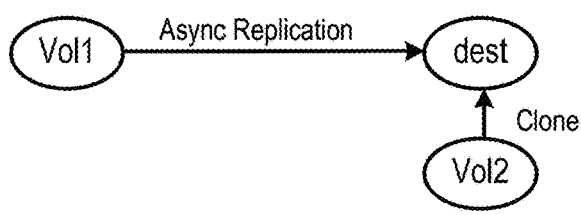
Figure 18E:
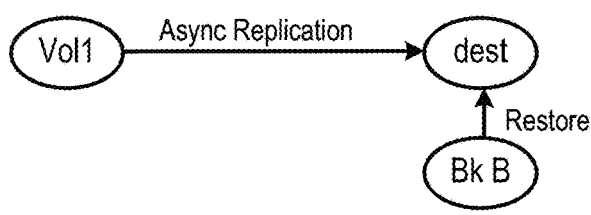
Figure 18F:
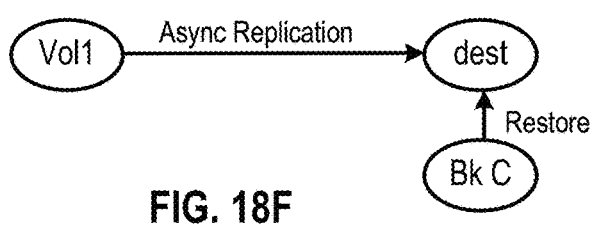

FIG. 17 is an example of processing flow to plan the data copy configuration for the application migration and for reusing another application's data, in accordance with an example implementation. This processing is performed by the management tool when users request to deploy an application, create a volume, modify application/volume settings, or migrate application.

Firstly, the management tool determines the data used by the application to be migrated or the application specified as the data source at 1701. This can be identified by searching the App column of the data management table. For example, in the case of the data management table illustrated in FIG. 5, if App1 is specified, it can be identified as Vol1. In the following, the data determined in this step is referred to as the copy source data.

Next, the management tool determines all data that has a copy relation with the determined data which user specified application uses at 1702. This can be done by searching the From column of the copy relationship management table using the ID of the determined data as a key. In addition, by recursively searching the From column of the copy relation management table using the To field of the entry obtained as a result of the search as a key, data with an indirect copy relation is also determined. For example, in the case of the copy relationship table illustrated in FIG. 8, the data that has a copy relationship with Vol 1, which is identified as being used by App 1, is identified as Vol 2, Bk A, BK B, and BK C. In the following, the data determined in this step is referred to as the replica.

Next, the management tool plans copy configuration patterns which uses the data determined at the first and second step at 1703. To do this, firstly, the management tool determines the storages which have copy source data and its replicas by referring data management table. In addition, the management tool determines applicable copy method to copy the copy source data or its replicas from the determined storage to user-specified storage by referring the available copy method information. Based on the determined information, the management tool makes copy configuration patterns. At this time, both the configuration patterns which copy whole data from the copy source data (data determined in the first step) and the configuration patterns which copy from each replica (data determined in the second step) and then copy the difference between the replica and the copy source data from the copy source data are made. At this time, replicas for which the Deleted flag of the entry in the copy relation management table is yes are excluded from the copy configuration pattern because they have already been deleted. The copy configuration pattern is created based on each of the information illustrated FIG. 5, FIG. 6, and FIG. 7 is illustrated in FIG. 18A-FIG. 18F.

In the second step, BkA is also determined as data having a copy relation with Vol1 used by the user-specified application. However, pattern using BkA is excluded because the Deleted flag is yes in the copy relationship table.

Next, the management tool evaluates the cost of each copy configuration pattern at 1704. An example of a cost estimation formula is as follows:

$$\text{Cost} = \text{communication unit price to copy from replica} \times \text{data size of replica} + \text{communication unit price to copy from copy source data} \times \text{difference size}$$

The communication unit price can be determined by referring to the available copy information. The data size of replica can be specified by referring to the data management table. The difference size can be determined by referring to the copy relationship management table. Instead of estimation, the difference size can be calculated by comparing the replica with the source data. For this calculation, existing techniques can be utilized to do so. If the replica has been created through multiple copies from the source data, the difference size can be estimated by summing up the Diff size of the multiple copies. In the case of a copy configuration pattern that does not use replicas and copies the whole data from the source data, the management tool calculates costs with data size of replica as zero and the difference size as the size of the copy source data. If the estimated cost of the pattern is equal to or smaller than the cost requirement, the management tool determine the pattern can meet the cost requirement.

Finally, the management tool evaluates the copy time for each copy configuration pattern at 1705. An example of a cost estimation formula is as follows:

$$\text{Copy time} = \frac{\text{data size of replica}}{\text{Throughput to access the replica}} + \text{wait time to access the replica} + \frac{\text{difference size}}{\text{Throughput to access the copy source data}}$$

The throughput to access replica or the copy source data can be determined by referring to the available copy information. The wait time to access the replica is also determined by referring to the available copy information. Determinations of data size of replica, difference size is same as previous step. In the case of a copy configuration pattern that does not use replicas and copies the whole data from the source data, the management tool calculates costs with data size of replica as zero and the difference size as the size of the copy source data. If the estimated copy time of the pattern is equal to or smaller than the copy time requirement, the management tool determine the pattern can meet the copy time requirement.

The results of this processing are presented to users in the UI illustrated in FIG. 13. In this case, configuration patterns which do not meet the copy cost and time requirements specified by the users can be excluded from the presentation. The one selected by the user in this UI is established by the management tool. In the case of use through declarative IaC instead of interactive UI, the configuration pattern that satisfies the requirements specified by the user is automatically selected and established. If there are multiple configuration patterns that satisfy the requirements, the management tool selects one according to the selection policy specified by the user and establishes the selected configuration pattern.

When the selected copy configuration is established, the copy configuration is recorded in the copy relation management table. Even in the configuration where multiple copies exist, the new entry is recorded as a copy from the copy source data to the copy destination data.

Through the example implementations described herein, the operators can easily select and provision a data copy configuration which is better (more suitable) in terms of availability, agility, and cost from the innumerable copy configuration pattern.

In addition, at the time, the operators do not need to have specialized knowledge of the IT infrastructure, such as the specifications of the copy function of storage, or knowledge of the current system configuration to perform this operation.

Figure 19:
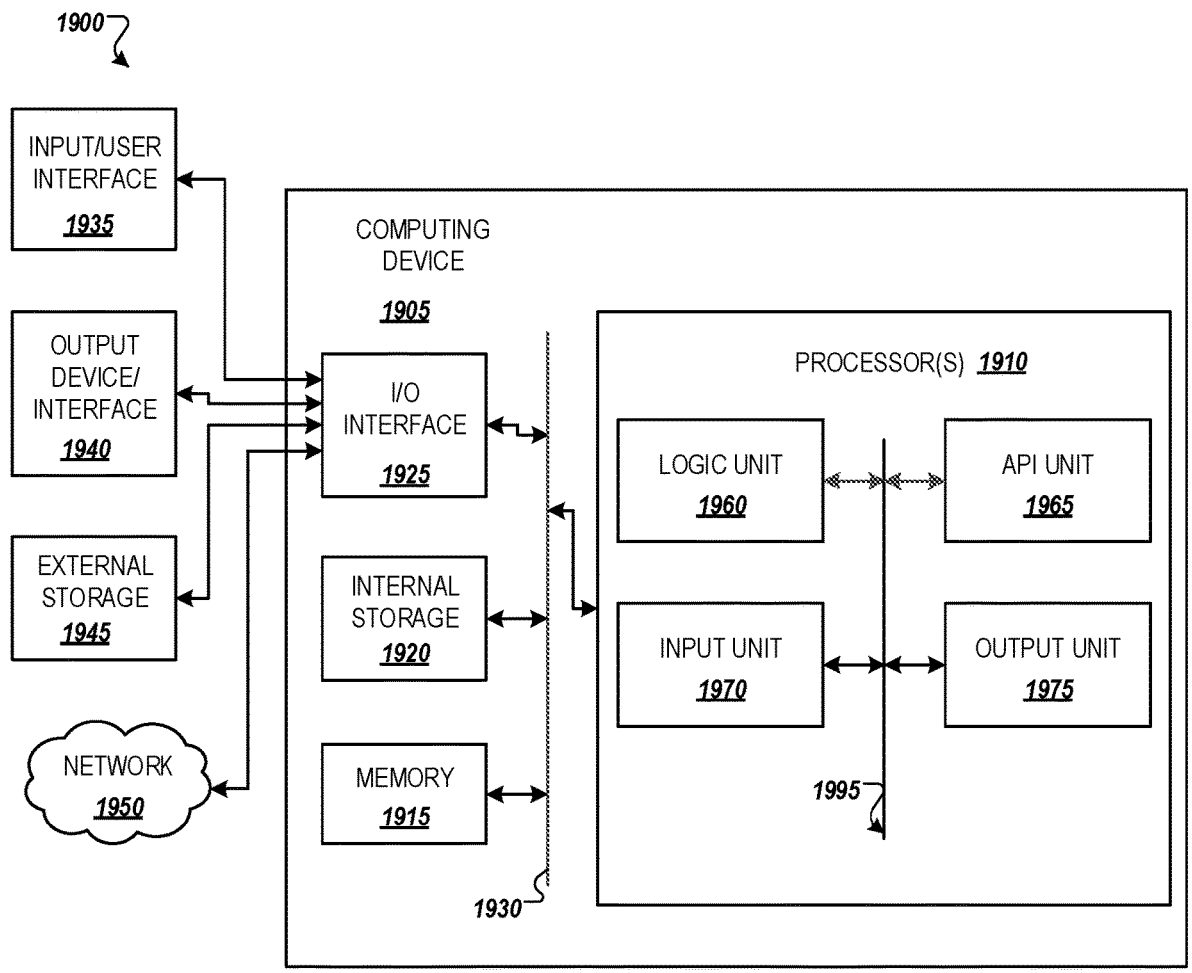
FIG. 19 illustrates an example computing environment with an example computer device suitable for use in some example implementations.

FIG. 19 illustrates an example computing environment with an example computer device suitable for use in some example implementations. Computer device 1905 in computing environment 1900 can include one or more processing units, cores, or processors 1910, memory 1915 (e.g., RAM, ROM, and/or the like), internal storage 1920 (e.g., magnetic, optical, solid state storage, and/or organic), and/or I/O interface 1925, any of which can be coupled on a communication mechanism or bus 1930 for communicating information or embedded in the computer device 1905. I/O interface 1925 is also configured to receive images from cameras or provide images to projectors or displays, depending on the desired implementation.

Computer device 1905 can be communicatively coupled to input/user interface 1935 and output device/interface 1940. Either one or both of input/user interface 1935 and output device/interface 1940 can be a wired or wireless interface and can be detachable. Input/user interface 1935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1940 may include a display, television, monitor, printer, speaker, braille, or the like. In some example implementations, input/user interface 1935 and output device/interface 1940 can be embedded with or physically coupled to the computer device 1905. In other example implementations, other computer devices may function as or provide the functions of input/user interface 1935 and output device/interface 1940 for a computer device 1905.

Examples of computer device 1905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1905 can be communicatively coupled (e.g., via I/O interface 1925) to external storage 1945 and network 1950 for communicating with any number of networked components, devices, and systems, including one or more computer devices of the same or different configuration. Computer device 1905 or any connected computer device can be functioning as, providing services of, or referred to as a server, client, thin server, general machine, special-purpose machine, or another label.

I/O interface 1925 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1900. Network 1950 can be any network or combination of networks (e.g., the Internet, local area network, wide area network, a telephonic network, a cellular network, satellite network, and the like).

Computer device 1905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1910 can execute under any operating system (OS) (not shown), in a native or virtual environment. One or more applications can be deployed that include logic unit 1960, application programming interface (API) unit 1965, input unit 1970, output unit 1975, and inter-unit communication mechanism 1995 for the different units to communicate with each other, with the OS, and with other applications (not shown). The described units and elements can be varied in design, function, configuration, or implementation and are not limited to the descriptions provided. Processor(s) 1910 can be in the form of hardware processors such as central processing units (CPUs) or in a combination of hardware and software units.

In some example implementations, when information or an execution instruction is received by API unit 1965, it may be communicated to one or more other units (e.g., logic unit 1960, input unit 1970, output unit 1975). In some instances, logic unit 1960 may be configured to control the information flow among the units and direct the services provided by API unit 1965, input unit 1970, output unit 1975, in some example implementations described above. For example, the flow of one or more processes or implementations may be controlled by logic unit 1960 alone or in conjunction with API unit 1965. The input unit 1970 may be configured to obtain input for the calculations described in the example implementations, and the output unit 1975 may be configured to provide output based on the calculations described in example implementations.

Processor(s) 1910 can be configured to execute a method or instructions involving, responsive to a request to deploy an application using a storage of a storage system, create volumes for the application or modify a configuration of the application or volumes used by the application, managing a storage configuration for the application; managing data information and storage configuration information associated with a copy relationship between data used by the application and the storage configuration for the storage system; extracting and evaluating possible configuration patterns from the data information and the storage configuration information; and providing ones of the possible configuration patterns that satisfy specified requirements for the application.

Processor(s) 1910 can be configured to execute a method or instructions as described above, and further involve automatically selecting a configuration pattern from the ones of the possible configuration patterns to reconfigure the storage configuration of the storage system.

Processor(s) 1910 can be configured to execute a method or instructions as described above, wherein the evaluating and extracting the possible configuration patterns from the data information and the storage configuration information can involve determining a first storage managing primary data used by the application from the data information; extracting the possible configuration patterns from the storage system facilitating storage of primary data based on the data information, the possible configuration patterns configured for replicating the data of the application from the determined first storage system to other storage; determining an achievable recovery point, an availability and cost for each of the possible configuration patterns; and determining ones of the possible configuration patterns that satisfy the specified requirements for the application based on the achievable recovery point and the availability.

Processor(s) 1910 can be configured to execute a method or instructions as described above, wherein the extracting the possible configuration patterns from the storage system facilitating storage of the primary data based on the data information involves generating a directed graph comprising the determined first storage as a vertex and configurable copies stored in storage systems as directed edges; and extracting the possible configuration patterns as subgraphs of the directed graph.

Processor(s) 1910 can be configured to execute a method or instructions as described above, wherein the extracting the possible configuration patterns as subgraphs of the directed graph comprises eliminating ones of the subgraphs that include cycles or have a number of edges above a threshold.

Processor(s) 1910 can be configured to execute a method or instructions as described above, wherein the determining the achievable recovery point for the each of the possible configuration patterns involves weighing each edge based on an achievable recovery point of each copy from the specified requirements; and calculating the achievable recovery point for each vertex of the each of the possible configuration patterns as a sum of the weights of each edges to the vertex.

Processor(s) can be configured to execute a method or instructions as described above, wherein the determining the availability for each of the possible configuration patterns involves weighing each edge based on an achievable recovery point of each copy from the specified requirements; and calculating, from a result of a topological sort for each of the subgraphs, the availability as a downage probability for all the storage systems in the each of the subgraphs.

Processor(s) 1910 can be configured to execute a method or instructions as described above, and further involve selecting one of provided ones of the possible configuration patterns that satisfy specified requirements having a lowest number of copies.

Processor(s) 1910 can be configured to execute a method or instructions as described above, and further involve selecting one of provided ones of the possible configuration patterns that satisfy specified requirements having a lowest data retention cost.

Processor(s) 1910 can be configured to execute a method or instructions as described above, further involving, responsive to a request to migrate the application or to reuse data of another application, extracting, based on the data information and associated configuration patterns, first data used by the application and reusable data in the associated configuration patterns; calculating a cost and a time of copying the first data and the reusable data through the associated configuration patterns, a first difference between the first data and latest data, and a second difference between the reusable data and the latest data; and selecting ones of the associated configuration patterns that meets the specified requirements.

Processor(s) 1910 can be configured to execute a method or instructions as described above, wherein selecting ones of associated configuration patterns that meets the specified requirements involves selecting the one of the associated configuration patterns with lowest cost that meets the specified requirements.

Processor(s) 1910 can be configured to execute a method or instructions as described above, wherein selecting ones of associated configuration patterns that meets the specified requirements comprises selecting the one of the associated configuration patterns with shortest copy time that meets the specified requirements.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method comprising:
   responsive to a request to deploy an application using a storage of a storage system, create volumes for the application or modify a configuration of the application or volumes used by the application:
   managing a storage configuration for the application;
   managing data information and storage configuration information associated with a copy relationship between data used by the application and the storage configuration for the storage system;
   extracting and evaluating possible configuration patterns from the data information and the storage configuration information;
   providing ones of the possible configuration patterns that satisfy specified requirements for the application; and
   responsive to a request to migrate the application or to reuse data of another application, performing steps comprising:
   extracting, based on the data information and associated configuration patterns, first data used by the application and reusable data in the associated configuration patterns;
   calculating a cost and a time of copying the first data and the reusable data through the associated configuration patterns, a first difference between the first data and latest data, and a second difference between the reusable data and the latest data; and
   selecting ones of the associated configuration patterns that meets the specified requirements.

2. The method of claim 1, further comprising automatically selecting a configuration pattern from the ones of the possible configuration patterns to reconfigure the storage configuration of the storage system.

3. The method of claim 1, further comprising selecting one of provided ones of the possible configuration patterns that satisfy specified requirements having a lowest number of copies.

4. The method of claim 1, further comprising selecting one of provided ones of the possible configuration patterns that satisfy specified requirements having a lowest data retention cost.

5. The method of claim 1, wherein selecting ones of associated configuration patterns that meets the specified requirements comprises selecting the one of the associated configuration patterns with lowest cost that meets the specified requirements.

6. The method of claim 1, wherein selecting ones of associated configuration patterns that meets the specified requirements comprises selecting the one of the associated configuration patterns with shortest copy time that meets the specified requirements.

7. A non-transitory computer readable medium, storing instructions for executing a process, the instructions comprising:
- responsive to a request to deploy an application using a storage of a storage system, create volumes for the application or modify a configuration of the application or volumes used by the application:
- managing a storage configuration for the application;
- managing data information and storage configuration information associated with a copy relationship between data used by the application and the storage configuration for the storage system;
- extracting and evaluating possible configuration patterns from the data information and the storage configuration information;
- providing ones of the possible configuration patterns that satisfy specified requirements for the application; and
- responsive to a request to migrate the application or to reuse data of another application, performing steps comprising:
  - extracting, based on the data information and associated configuration patterns, first data used by the application and reusable data in the associated configuration patterns;
  - calculating a cost and a time of copying the first data and the reusable data through the associated configuration patterns, a first difference between the first data and latest data, and a second difference between the reusable data and the latest data; and
  - selecting ones of the associated configuration patterns that meets the specified requirements.

8. An apparatus, comprising:
a processor, configured to:
- responsive to a request to deploy an application using a storage of a storage system, create volumes for the application or modify a configuration of the application or volumes used by the application:
- manage a storage configuration for the application;
- manage data information and storage configuration information associated with a copy relationship between data used by the application and the storage configuration for the storage system;
- extract and evaluating possible configuration patterns from the data information and the storage configuration information;
- provide ones of the possible configuration patterns that satisfy specified requirements for the application; and
- responsive to a request to migrate the application or to reuse data of another application:
- extract, based on the data information and associated configuration patterns, first data used by the application and reusable data in the associated configuration patterns;
- calculate a cost and a time of copying the first data and the reusable data through the associated configuration patterns, a first difference between the first data and latest data, and a second difference between the reusable data and the latest data; and
- select ones of the associated configuration patterns that meets the specified requirements.

* * * * *